United States Patent
Heinz et al.

(10) Patent No.: US 10,626,968 B2
(45) Date of Patent: Apr. 21, 2020

(54) MOTOR VEHICLE DRIVETRAIN

(71) Applicant: GM GLOBAL TECHNOLOGY OPERATIONS LLC, Detroit, MI (US)

(72) Inventors: Julian Heinz, Ruesselsheim (DE); Martin Gentile, Ruesselsheim (DE); Matthias Urban, Ruesselsheim (DE); Markus Steckhan, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 586 days.

(21) Appl. No.: 15/443,218

(22) Filed: Feb. 27, 2017

(65) Prior Publication Data

US 2017/0248212 A1 Aug. 31, 2017

(30) Foreign Application Priority Data

Feb. 25, 2016 (DE) .......................... 10 2016 002 220

(51) Int. Cl.
*F16H 37/06* (2006.01)
*F16H 37/02* (2006.01)
*F16H 61/70* (2006.01)

(52) U.S. Cl.
CPC ............ *F16H 37/06* (2013.01); *F16H 37/022* (2013.01); *F16H 61/70* (2013.01); *F16H 2037/023* (2013.01)

(58) Field of Classification Search
CPC ........ F16H 37/06; F16H 37/022; F16H 61/70; F16H 2037/023
USPC ............................................................ 74/745
See application file for complete search history.

(56) References Cited

U.S. PATENT DOCUMENTS

| | | | | |
|---|---|---|---|---|
| 3,340,749 A | * | 9/1967 | Schreiner | ............ F16H 37/0846 475/211 |
| 4,599,916 A | * | 7/1986 | Hirosawa | ................ F16H 37/02 475/210 |
| 4,624,153 A | * | 11/1986 | Itoh | ..................... F16H 37/0846 475/211 |

(Continued)

FOREIGN PATENT DOCUMENTS

| | | |
|---|---|---|
| DE | 19654695 A1 | 7/1997 |
| DE | 10212790 A1 | 11/2003 |

(Continued)

OTHER PUBLICATIONS

German Patent Office, German Search Report for German Application No. 102016002220.5, dated Nov. 16, 2016.

*Primary Examiner* — Ha Dinh Ho

(57) ABSTRACT

A motor vehicle drivetrain features an input shaft, an output shaft, a continuously variable transmission for coupling the input shaft to the output shaft with a variable transmission ratio between the input shaft and the output shaft, and a bypass transmission with at least one bypass gearing, which has a fixed transmission ratio, in order to couple the input shaft to the output shaft. A value of a transmission ratio of the bypass gearing is less than or equal to half the sum of a value of the maximum forward motion and a value of the minimum forward motion of the variable transmission ratio between the input shaft and the output shaft driven of the continuously variable transmission and/or less than or equal to 1.0. The bypass transmission is configured for driving the motor vehicle with a driving speed of at least 50 km/h or 31 mph.

17 Claims, 3 Drawing Sheets

(56) References Cited

U.S. PATENT DOCUMENTS

| | | | |
|---|---|---|---|
| 5,803,858 A | | 9/1998 | Haka |
| 5,853,343 A | * | 12/1998 | Eggert .................. F16H 37/022 |
| | | | 475/210 |
| 2006/0247086 A1 | * | 11/2006 | Watanabe .............. B60K 6/365 |
| | | | 475/208 |

FOREIGN PATENT DOCUMENTS

| | | |
|---|---|---|
| EP | 0095132 A1 | 11/1983 |
| EP | 0828094 A2 | 3/1998 |
| EP | 0905414 A2 | 3/1999 |
| EP | 2988032 A1 | 2/2016 |
| WO | 2013137100 A1 | 9/2013 |

\* cited by examiner

MOTOR VEHICLE DRIVETRAIN

CROSS-REFERENCE TO RELATED APPLICATION

This application claims priority to German Patent Application No. 102016002220.5, filed Feb. 25, 2016, which is incorporated herein by reference in its entirety.

TECHNICAL FIELD

The present disclosure pertains to a drivetrain for a motor vehicle, a motor vehicle with the motor vehicle drivetrain, as well as a method for operating the motor vehicle drivetrain.

BACKGROUND

EP 0 828 094 A2 discloses a motor vehicle drivetrain with an input shaft, an output shaft, a first transmission with a fixed transmission ratio and a second transmission with a continuously variable transmission ratio, which is arranged parallel to the first transmission.

In order to start from a standstill, the first transmission with the fixed transmission ratio couples the input and output shafts. The drivetrain is upshifted from this low first gear to the continuously variable second transmission by engaging a clutch.

SUMMARY

The present disclosure provides an improved motor vehicle and operation thereof. According to an embodiment of the present disclosure, a drivetrain for a motor vehicle, especially a passenger car, features at least one input shaft and at least one output shaft. At least one continuously variable transmission selectively couples the input shaft to the output shaft with a variable transmission ratio having a maximum forward motion and a minimum forward motion. At least one bypass transmission with at least one bypass gearing having a fixed or constant transmission ratio selectively couples the input shaft to the output shaft. A value of the transmission ratio of the bypass transmission, particularly by the bypass gearing, between the input shaft and the output shaft driven is, in an embodiment, less than or equal to half the sum of the value of the maximum forward motion and the value of the minimum forward motion of the variable transmission ratio between the input shaft and the output shaft driven by or via or by the continuously variable transmission and in another embodiment not greater than 1.0.

In an embodiment, the bypass gearing or bypass transmission can be advantageously used, in particular, at higher driving speeds of the motor vehicle, at which low transmission ratios are adjusted between the input and output shafts of the transmission, especially at speeds in excess of 50 km/h (31 mph), particularly in excess of 100 km/h (about 62 mph). In this way, the continuously variable transmission can in an embodiment be relieved in such driving states, particularly in an automated fashion. The energy consumption can thereby be reduced in an embodiment.

In an embodiment, the input shaft is a shaft on the drive side and especially is coupled, to a drive of the motor vehicle, such as an internal combustion engine and/or an electric drive by a torque converter. The output shaft is a shaft on the vehicle-driven or wheel side and especially is coupled to one or more driven wheels of the motor vehicle by a differential.

In an embodiment, the continuously variable transmission (CVT) is realized in the form of a mechanical, electric or hydraulic CVT transmission. In an enhancement, the CVT features two pulleys, particularly double cones, that are coupled by at least one revolving traction and/or thrust element, especially a V-belt, a pushbelt, a chain or the like. The axial distance between the opposing contact surfaces of at least one double cone with the traction and/or thrust element can in an embodiment be varied or adjusted hydraulically, especially by hydraulically displacing one cone of the double cone in order to vary or adjust the transmission ratio of the transmission in a continuously variable fashion. Supplementary information in this respect can be found in initially cited EP 0 828 094 A2, the entire content of which is hereby incorporated into the present disclosure by reference. In an embodiment, a constructively simple, precise and/or reliable continuously variable transmission and/or a broad transmission bandwidth can thereby be made available.

In an embodiment, the continuously variable transmission respectively is rigidly or permanently coupled to the input or output shaft of the drivetrain. A driving shaft of the continuously variable transmission is rigidly or permanently connected to the input shaft of the drivetrain, or a driven shaft of the continuously variable transmission is rigidly or permanently connected to the output shaft of the drivetrain. In an embodiment, the structural space and/or the weight of the drivetrain can thereby be reduced and/or the torque transmission can be improved. The continuously variable transmission, particularly a driving shaft or driven shaft of the continuously variable transmission, is in an embodiment separably coupled to the input or output shaft of the drivetrain, especially by at least one free-wheel mechanism or at least one clutch that can be selectively engaged or by an actuator. In an embodiment, at least one transmission element of the continuously variable transmission, particularly at least one pulley or double cone, is separably coupled to the driving shaft or driven shaft of the continuously variable transmission, especially by at least one free-wheel mechanism or at least one clutch that can be selectively engaged or by an actuator. In an embodiment, the continuously variable transmission can thereby be decoupled and consequently relieved.

In an embodiment, the transmission ratio (i) between the input shaft and the output shaft conventionally is the quotient of a speed $n_{in}$ of the input shaft divided by a speed $n_{out}$ of the output shaft driven thereby ($i=n_{in}/n_{out}$). In an embodiment, a positive transmission ratio $0<i<1$ therefore designates an identically directed speed increasing ratio, a positive transmission ratio $1<i$ designates an identically directed step-down or speed reducing ratio, a negative transmission ratio $-1<i<0$ designates an oppositely directed or rotationally reversed speed increasing ratio and a negative transmission ratio $i<-1$ designates an oppositely directed or rotationally reversed step-down or speed reducing ratio.

In an embodiment, the maximum forward motion and/or the minimum forward motion of the variable transmission ratio is defined or specified constructively or control-technologically by minimum and maximum distances between the double cone contact surfaces or the like. In an embodiment, a maximum or minimum forward motion respectively refers to the value of the maximum or minimum transmission ratio in the forward driving direction of the motor vehicle, especially when the input shaft is driven by its drive. In an embodiment, the maximum and minimum forward motion define or limit the transmission ratio between input and output shaft in the forward driving direction of the motor vehicle when the output shaft is driven by the input shaft via the continuously variable transmission.

In an embodiment, the bypass gearing of the bypass transmission may feature a cylindrical gearing, which include a cylindrical gearing having a transmission ratio which may be respectively fixed or constantly defined or specified, by its number of teeth. In an embodiment, an efficient and/or compact transmission can thereby be made available. The bypass gearing forms the bypass transmission in an embodiment or the bypass transmission consists of the bypass gearing. In an embodiment, an efficient and/or compact bypass transmission can thereby be made available. The bypass transmission as a whole may have one or several selectable fixed transmission ratios. In an embodiment, a bypass transmission with a single fixed transmission ratio can be realized in the form of a compact bypass transmission. A bypass transmission with several selectable fixed transmission ratios makes it possible to expand the range of applications. If the bypass transmission has several selectable fixed transmission ratios, the transmission ratio between the input shaft and the output shaft driven by the bypass transmission may be the transmission ratio between the input shaft and the output shaft driven by the bypass transmission with its lowest transmission ratio, particularly in terms of its value.

In an embodiment, the transmission ratio between the input shaft and the output shaft driven by the bypass transmission, particularly the bypass gearing, and the variable transmission ratio between the input shaft and the output shaft driven by the continuously variable transmission have the same preceding sign. In other words, the input and output shafts can be driven in the same direction by the bypass gearing and the continuously variable transmission. In an embodiment, an advantageous change-over between the continuously variable transmission and the bypass transmission can thereby be made available.

In an embodiment, a value of at least one transmission ratio between the input shaft and the output shaft driven thereby via the bypass transmission, particularly the bypass gearing, is less than or equal to 1.0, especially less than or equal to 0.85, particularly less than or equal to 0.7. In this way, the bypass gearing can be used at higher driving speeds, especially at speeds in excess of 50 km/h (31 mph), particularly in excess of 100 km/h (62 mph), in order to thereby relieve the continuously variable transmission.

Additionally or alternatively, the value of at least one or the transmission ratio between the input shaft and the output shaft driven thereby via the bypass transmission, particularly the bypass gearing, is less than or equal to half the sum of the values of the maximum forward motion and the minimum forward motion of the variable transmission ratio between the input shaft and the output shaft driven via the continuously variable transmission, preferably less than or equal to one-third of the sum of the value of the maximum forward motion and twice the value of the minimum forward motion of this variable transmission ratio, especially less than or equal to one-fourth of the sum of the value of the maximum forward motion and three-times the value of the minimum forward motion of this variable transmission ratio, particularly less than or equal to one-tenth of the sum of the value of the maximum forward motion and nine-times the value of the minimum forward motion of this variable transmission ratio:

$$i_f \leq (i_{max}+i_{min})/2 = i_{min}+(i_{max}-i_{min})/2;$$

$$\text{preferably}, i_f \leq (i_{max}+2 \cdot i_{min})/3 = i_{min}+(i_{max}-i_{min})/3;$$

$$\text{especially}, i_f \leq (i_{max}+3 \cdot i_{min})/4 = i_{max}-i_{min}/4; \text{ and}$$

$$\text{particularly}, i_f \leq (i_{max}+i_{min})/10 = i_{min}+(i_{max}-i_{min})/10;$$

wherein $i_f$ is the value of the transmission ratio between the input shaft and the output shaft driven via the bypass transmission, $i_{max}$ is the value of the maximum forward motion of the variable transmission ratio and $i_{min}$ is the value of the minimum forward motion of the variable transmission ratio between the input shaft and the output shaft driven via the continuously variable transmission.

In an embodiment, the bypass gearing can be respectively used in a lower or faster range of a bandwidth made available by the continuously variable transmission or of a spread of the variable transmission ratio and therefore at higher driving speeds in order to relieve the continuously variable transmission.

In an embodiment, the drivetrain features a shift transmission for coupling the continuously variable transmission to the output shaft or to the input shaft. The shift transmission has a first forward gear with a first fixed forward transmission ratio. In an enhancement, the shift transmission has at least one second forward gear with a second fixed forward transmission ratio that differs from the first fixed forward transmission ratio. In an enhancement, the shift transmission additionally or alternatively has at least one reverse gear with a fixed reverse transmission ratio. In an embodiment, a useful range of the continuously variable transmission can thereby be expanded.

In an embodiment, the bypass transmission, particularly the bypass gearing, is rigidly or separably coupled to the input shaft, the output shaft and/or a driving shaft and/or a driven shaft of the continuously variable transmission and/or the shift transmission. In an enhancement, the bypass transmission, particularly the bypass gearing, is rigidly coupled to the input shaft and/or a driving shaft of the continuously variable transmission and separably coupled to a driven shaft of the continuously variable transmission and/or a driving shaft of the shift transmission. Vice versa, the bypass transmission is in another enhancement rigidly coupled to a driven shaft of the continuously variable transmission and/or a driving shaft of the shift transmission and separably coupled to the input shaft and/or a driving shaft of the continuously variable transmission. In another enhancement, the bypass transmission is separably coupled to the input shaft and/or a driving shaft of the continuously variable transmission and rigidly coupled to the output shaft and/or a driven shaft of the shift transmission. In an embodiment, the bypass transmission, the continuously variable transmission and, if applicable, the shift transmission can be advantageously realized and/or connected to one another in a particularly compact fashion.

In an embodiment, the bypass transmission, particularly the bypass gearing, and the continuously variable transmission are respectively arranged parallel to one another kinematically or in the flow of forces. In an embodiment, the bypass transmission or the bypass gearing can, if so required, (kinematically) bypass the continuously variable transmission or the output shaft can be alternatively driven by the input shaft via the continuously variable transmission or the bypass transmission. If the drivetrain features a shift transmission, the bypass transmission, particularly the bypass gearing, and the shift transmission may in an embodiment respectively be arranged parallel or serial to one another kinematically or in the flow of forces. In other words, the bypass transmission, particularly the bypass gearing, can in an embodiment also bypass the shift transmission arranged parallel thereto. This may be particularly advantageous if a transmission ratio of the continuously variable transmission can in accordance with an enhancement be selectively increased by the shift transmission in order to realize a slow gear. In an embodiment, the bypass transmission, particularly the bypass gearing, similarly may only bypass the continuously variable transmission (arranged parallel thereto) and drive the shift transmission (arranged serial thereto) like the continuously variable transmission. This may be particularly advantageous if a transmission ratio of the continuously variable transmission can in accordance with an enhancement be selectively reduced by the shift transmission in order to realize a fast gear. In an embodiment, the further bypass of the shift transmission can additionally or alternatively improve the efficiency and/or the bypass of only the continuously variable transmission or only the serially arranged shift transmission can improve the structural space conditions.

In an embodiment, the bypass transmission, particularly the bypass gearing, and/or the continuously variable transmission features a free-wheel mechanism or a clutch, particularly a positive clutch or friction disk clutch, which can be selectively engaged, in particular, mechanically, hydraulically, pneumatically or electrically, especially electromagnetically, by a mechanical, hydraulic, pneumatic and/or electric actuator, especially an electromagnetic actuator. In other words, the bypass transmission, particularly the bypass gearing, and/or the continuously variable transmission can in an embodiment be (passively or actively) shifted. In an embodiment, simple and/or reliable automatic coupling and decoupling can be realized with a free-wheel mechanism whereas purposeful or controlled coupling and decoupling, which therefore can be adapted to different boundary conditions, can be realized with a selectively engageable clutch.

In an embodiment, such a clutch that can be selectively engaged, in particular, by a mechanical, hydraulic, pneumatic and/or electric actuator, especially an electromagnetic actuator, may feature a frictionally and/or positively acting clutch and/or a synchronizing clutch, particularly consist of such a clutch. In an embodiment, reliable coupling can be realized with a positive clutch whereas gentle coupling can be realized with a friction clutch and jerk-free coupling can be realized with a synchronizing clutch of the type known, in particular, from manual shift transmissions.

In an embodiment of the present disclosure, a method for controlling, a motor vehicle drivetrain of the type described herein is also provided. The input shaft is automatically coupled to the output shaft by the bypass transmission, particularly the bypass gearing, in dependence on a current transmission ratio of the continuously variable transmission, particularly if a deviation between the current transmission ratio between the input shaft and the output shaft driven by the continuously variable transmission and the transmission ratio between the input shaft and the output shaft driven by the bypass transmission, particularly the bypass gearing, falls short of a specified limiting value, especially if the transmission ratio between the input shaft and the output shaft driven by the continuously variable transmission at least essentially corresponds to the transmission ratio between the input shaft and the output shaft driven by the bypass transmission, particularly the bypass gearing.

Accordingly, the drivetrain features in an embodiment automatically couples the input shaft to the output shaft by the bypass transmission, particularly the bypass gearing, in dependence on a current transmission ratio of the continuously variable transmission, particularly if a deviation between the current transmission ratio between the input shaft and the output shaft driven by the continuously variable transmission and the transmission ratio between the input shaft and the output shaft driven by the bypass transmission, particularly the bypass gearing, falls short of a specified limiting value, especially if the transmission ratio between the input shaft and the output shaft driven by the continuously variable transmission at least essentially corresponds to the transmission ratio between the input shaft and the output shaft driven by the bypass transmission, particularly the bypass gearing.

Additionally or alternatively, the input shaft may in an embodiment be automatically coupled to the output shaft by the bypass transmission, particularly the bypass gearing, in dependence on a current driving speed of the motor vehicle, especially if the driving speed is higher than a specified minimum driving speed, which in an embodiment amounts to at least 50 km/h (31 mph), particularly 60 km/h (62 mph) or more.

Additionally or alternatively, the bypass transmission, particularly the bypass gearing, can in an embodiment be automatically decoupled in dependence on a current driving speed of the motor vehicle, especially if the driving speed is higher than a specified maximum driving speed, which in an embodiment amounts to no more than 200 km/h (124 mph), particularly 170 km/h (105 mph) or less, and/or if the driving speed is lower than a specified minimum driving speed, which in an embodiment amounts to at least 50 km/h (31 mph), particularly 60 km/(62 mph) or more.

In an embodiment, the bypass transmission, particularly the bypass gearing, can therefore automatically bypass the continuously variable transmission in a defined speed range, especially in a defined speed range that is higher than the specified minimum driving speed and/or lower than the specified maximum driving speed and therefore lies, for example, between 70 km/h (43 mph) and 160 km/h (99 mph).

Accordingly, the drivetrain is configured to automatically couple the input shaft to the output shaft by the bypass transmission, particularly the bypass gearing, in dependence on a current driving speed of the motor vehicle, especially if the driving speed is higher than a specified minimum driving speed, which in an embodiment amounts to at least 50 km/h (31 mph), particularly 60 km/h (62 mph) or more.

Additionally or alternatively, the drivetrain features is configured to automatically decouple the bypass transmission, particularly the bypass gearing, in dependence on a current driving speed of the motor vehicle, especially if the driving speed is higher than a specified maximum driving speed, which in an embodiment amounts to no more than 200 km/h (124 mph), particularly 170 km/h (105 mph) or less, and/or if the driving speed is lower than a specified minimum driving speed, which in an embodiment amounts to at least 50 km/h (31 mph), particularly 60 km/h (62 mph) or more.

In an embodiment, the bypass transmission, particularly the bypass gearing, is generally configured for driving the motor vehicle with a driving speed, particularly a forward driving speed, which amounts to at least 50 km/h (31 mph), especially for driving the motor vehicle with at least one (forward) driving speed, particularly in a (forward) driving speed range, which respectively lies between the aforementioned specified minimum driving speed and the aforementioned specified maximum driving speed, i.e. between at least 50 km/h (31 mph), particularly at least 60 km/h (52 mph), and no more than 200 km/h (124 mph), particularly no more than 170 km/h (105 mph), for example in a driving speed range between 70 km/h (43 mph) and 160 km/h (00 mph).

In an embodiment, the bypass transmission, particularly the bypass gearing, can be automatically used at higher driving speeds, especially in a defined speed range between specified minimum and maximum driving speeds, in order to relieve the continuously variable transmission.

In an embodiment, the method automatically reduces a hydraulic actuating force, especially a hydraulic pressure, of the continuously variable transmission or in the continuously variable transmission after the input shaft has been automatically coupled to the output shaft by the bypass transmission, particularly the bypass gearing. Accordingly, the drivetrain is configured to automatically reduce a hydraulic actuating force, especially a hydraulic pressure, of the continuously variable transmission or in the continuously variable transmission after the input shaft has been automatically coupled to the output shaft by the bypass transmission, particularly the bypass gearing.

In an embodiment, the continuously variable transmission can be relieved and/or the fuel consumption can be reduced.

In an enhancement, the hydraulic actuating force, especially the hydraulic pressure, is only reduced to a minimum value, which in an enhancement is chosen such that it still maintains or produces a specified tension of the traction and/or thrust means of the continuously variable transmission. Vibrations can thereby be prevented in an embodiment.

When the bypass transmission, particularly the bypass gearing, should be decoupled again, the actuating force, especially the hydraulic pressure, of the continuously variable transmission is automatically increased and the bypass transmission, particularly the bypass gearing, is then automatically decoupled, especially after building up or reaching the required actuating force of the continuously variable transmission for coupling the input and output shafts by the continuously variable transmission without the bypass transmission. Accordingly, the drivetrain is configured to automatically increase the actuating force, especially the hydraulic pressure, of the continuously variable transmission and for then automatically decoupling the bypass transmission, particularly the bypass gearing, especially after building up or reaching the required actuating force of the continuously variable transmission for coupling the input and output shafts by the continuously variable transmission without the bypass transmission, particularly the bypass gearing.

In the context of the present disclosure, portions of the drivetrain may be realized in the form of hardware and/or software technology, especially in the form of a digital processing unit, particularly a digital microprocessor unit (CPU), which is preferably connected to a storage and/or bus system via a data and signal link and/or features one or more programs or program modules. The CPU may be designed for processing commands that are implemented in the form of a program stored in a storage system, for acquiring input signals from a data bus and/or for delivering output signals to a data bus. A storage system may feature one or more storage mediums, especially different storage mediums such as optical, magnetic, solid-state and/or other non-volatile mediums. The program may be configured in such a way that it respectively embodies or is capable of implementing the methods described herein and the CPU can accordingly carry out the steps of such a method in order to thereby respectively control or operate, in particular, a drivetrain.

In the present context, a coupling refers, in particular, to a rotational coupling or such a coupling that a rotation of one element, particularly a shaft or a transmission element, inevitably causes a rotation of an element, particularly a shaft or a transmission element, (rotationally) coupled thereto or that one element drives or can drive the element (rotationally) coupled thereto.

In the present context, the variable transmission ratio between the input shaft and the output shaft driven by the continuously variable transmission particularly (also) refers to the (theoretical or virtual) transmission ratio between the input shaft and the output shaft when the output shaft can be or is driven by the input shaft via the continuously variable transmission (and, if applicable, also the shift transmission and/or another transmission), especially to the quotient of the speed of the input shaft divided by the speed of the output shaft when this output shaft is driven by the input shaft via the continuously variable transmission (and, if applicable, also the shift transmission and/or another transmission). Accordingly, the transmission ratio between the input shaft and the output shaft driven by the bypass transmission particularly (also) refers to the (theoretical or virtual) transmission ratio between the input shaft and the output shaft when the output shaft can be or is driven by the input shaft via the bypass transmission (and, if applicable, also the shift transmission and/or another transmission), especially to the quotient of the speed of the input shaft divided by the speed of the output shaft when this output shaft is driven by the input shaft via the bypass transmission (and, if applicable, also the shift transmission and/or another transmission).

If the output shaft is driven by the input shaft via the bypass gearing, a value of a transmission ratio between the input shaft and the output shaft therefore is in an embodiment no higher than equal to half the sum of the value of the maximum forward motion and the value of the minimum forward motion of the variable transmission ratio between the input shaft and the output shaft when this output shaft can be or is driven by the input shaft via the continuously variable transmission and/or no higher than equal to 1.0.

In an embodiment, the value of the transmission ratio between the input shaft and the output shaft driven (by the input shaft) via the bypass transmission, particularly the bypass gearing, is at least equal to the value of the minimum forward motion of the variable transmission ratio between the input shaft and the output shaft driven (by the input shaft) via the continuously variable transmission and/or at least equal to 0.1, particularly at least equal to 0.2.

In an embodiment, an overlap of the practicable transmission ratios of the bypass transmission and the continuously variable transmission makes it possible to improve a change-over between these transmissions whereas an advantageous useful range for the bypass transmission can be defined with the minimum transmission ratio practicable thereby.

In an embodiment, a drivetrain of the type described herein and a method of the type described herein respectively make it possible to increase the efficiency of the continuously variable transmission and, in particular, to reduce hydraulic losses and/or hydraulic heating in the continuously variable transmission and therefore $CO_2$ emissions at higher driving speeds, especially in excess of 50 km/h (31 mph), particularly in excess of 100 km/h (62 mph), by bypassing the continuously variable transmission with the bypass transmission that has a low transmission ratio between the input and output shafts. Additionally or alternatively, the service life of the drivetrain can thereby also be extended in an embodiment.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
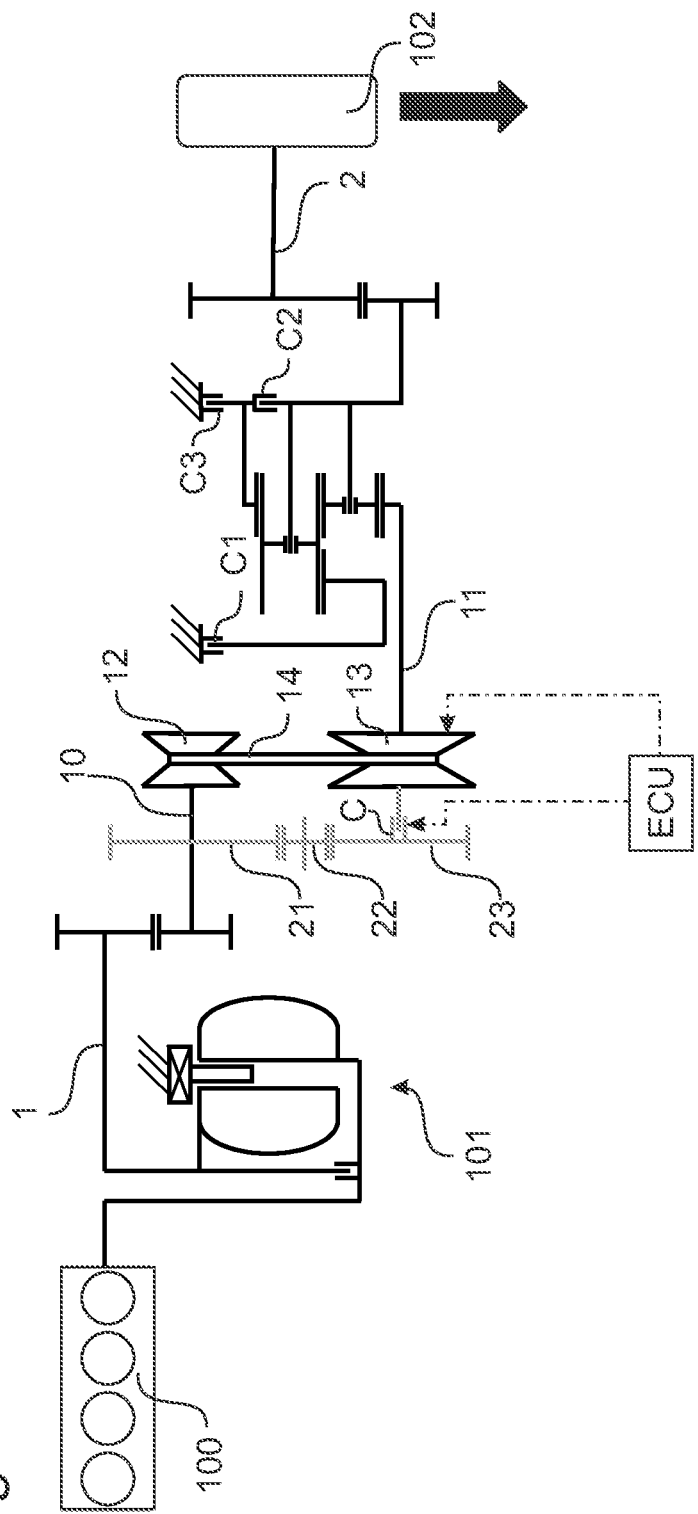
FIG. 1 shows a drivetrain of a motor vehicle according to an embodiment of the present disclosure.

FIG. 1 shows a drivetrain of a motor vehicle according to an embodiment of the present disclosure. The drivetrain features an internal combustion engine 100, an input shaft 1 that is coupled to the internal combustion engine 100 by a torque converter 101, an output shaft 2 that is coupled to at least one driven wheel 102, a continuously variable transmission with a driving shaft 10, which is coupled to the input shaft 1, and a driven shaft 11, and a bypass transmission with a bypass gearing in the form of a cylindrical gearing with a driving gearwheel 21, an intermediate gearwheel 22 meshing with the driving gearwheel and a driven gearwheel 23 meshing with the intermediate gearwheel. The cylindrical gearing 21-23 defines a fixed transmission ratio.

A double cone 12 of the continuously variable transmission, which is connected to the driving shaft 10 in a rotationally rigid fashion, and a double cone 13 of the continuously variable transmission, which is connected to the driven shaft 11 via a free-wheel mechanism, are coupled by a traction and/or thrust element 14. The axial distance between opposing contact surfaces of the double cone 13 is hydraulically adjustable. The input shaft 1 can therefore drive the output shaft 2 via the continuously variable transmission 10-14 with a variable transmission ratio between the input shaft 1 and the output shaft 2. The variable transmission ratio has a maximum forward motion and a minimum forward motion, which respectively are defined constructively or control-technologically by the adjustable axial distance.

For example, the transmission ratio between the input shaft 1 and the output shaft 2 driven by or via the continuously variable transmission (and the epicyclic gearing) or the transmission ratio between the input shaft 1 and the output shaft 2 when this output shaft is driven by the input shaft 1 by or via the continuously variable transmission (and an epicyclic gearing described in greater detail below) may lie between approximately 4 (for the first or starting forward gear) and 0.3 (for the highest or fastest forward gear) such that the maximum forward motion lies at about 4 and the minimum forward motion lies at about 0.3. The transmission ratio between the input shaft 1 and the output shaft 2 driven by or via the bypass gearing (and in the embodiments in FIGS. 1, 2 the epicyclic gearing with engaged clutch C2 and disengaged clutches C1, C3) or the transmission ratio between the input shaft 1 and the output shaft 2 when this output shaft is driven by or via the bypass gearing (and in the embodiments in FIGS. 1, 2 the epicyclic gearing with engaged clutch C2 and disengaged clutches C1, C3) amounts, for example, to 0.4 and therefore is lower than 1.0, as well as lower than 0.5·(4+3·0.3)/4, i.e. it lies in the bottom fourth of the bandwidth or spread of the variable transmission ratio between the input shaft 1 and the output shaft 2 driven by the continuously variable transmission.

The drivetrain features a shift transmission in the form of an epicyclic gearing for coupling the driven shaft 11 of the continuously variable transmission to the output shaft 2. The epicyclical gearing has a first forward gear with a first fixed forward transmission ratio, a second forward gear with a second fixed forward transmission ratio and a reverse gear with a fixed reverse transmission ratio. The first fixed forward transmission ratio of the epicyclic gearing can be adjusted by selectively engaging a first clutch C1 and disengaging a second clutch C2 and a third clutch C3, the second fixed forward transmission ratio of the epicyclic gearing, which differs from the first fixed forward transmission ratio, can be adjusted by selectively engaging the second clutch C2 and disengaging the first clutch C1 and the third clutch C3, and the oppositely directed fixed reverse transmission ratio of the epicyclic gearing can be adjusted by selectively engaging the third clutch C3 and disengaging the first clutch C1 and the second clutch C2.

In the exemplary embodiment illustrated in FIG. 1, the driving gearwheel 21 of the bypass gearing is rigidly connected to the driving shaft 10 of the continuously variable transmission, as well as the input shaft 1, and the driven gearwheel 23 is separably coupled to the driven shaft 11 of the continuously variable transmission and the output shaft 2 by a selectively engageable bypass clutch C.

The drivetrain features an electronic control unit or ECU that can engage and disengage the selectively engageable bypass clutch C electrically, mechanically, hydraulically or pneumatically. The bypass clutch C may consist, in particular, of a frictionally and/or positively acting clutch and/or a synchronizing clutch, for example a positive clutch or a friction disk clutch.

Figure 4:
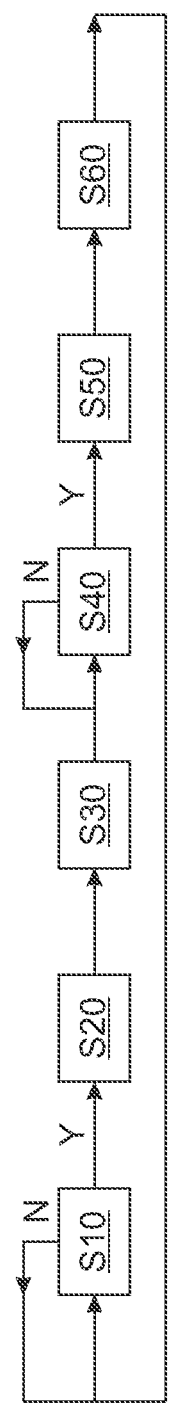
FIG. 4 shows a method for driving an output shaft of a motor vehicle drivetrain of the type illustrated in FIG. 1, 2 or 3 according to an embodiment of the present disclosure.
Figure 2:
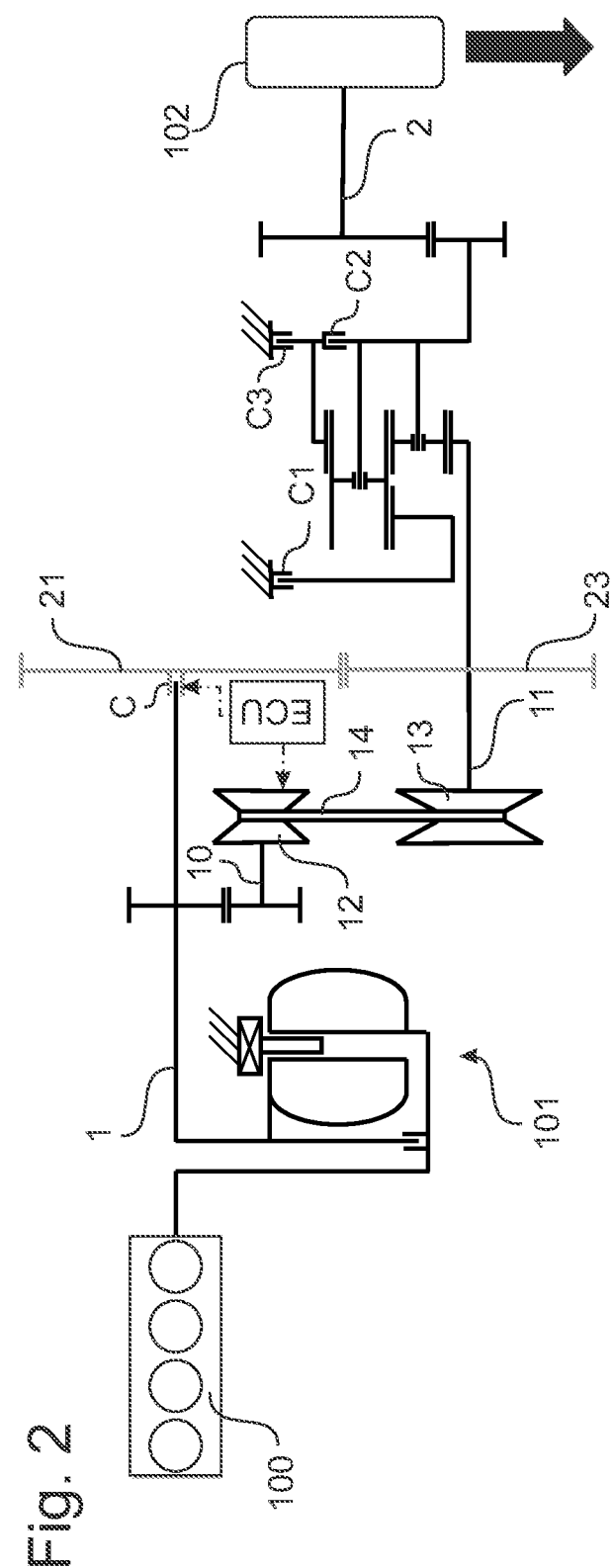
FIG. 2 shows a drivetrain of a motor vehicle according to another embodiment of the present disclosure.
Figure 3:
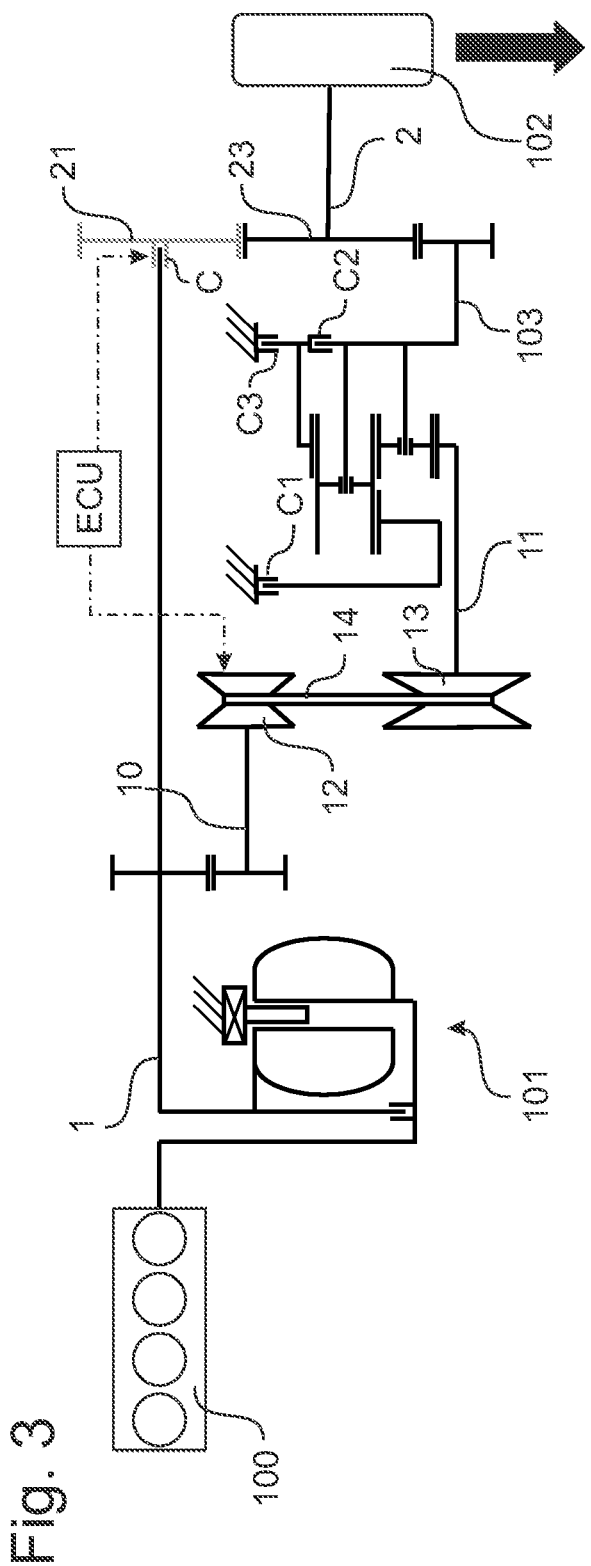
FIG. 3 shows a drivetrain of a motor vehicle according to another embodiment of the present disclosure.

The ECU carries out or is configured with program code to execute a method for driving the output shaft 1 of the motor vehicle drivetrain illustrated in FIG. 1, 2 or 3, for example as illustrated in FIG. 4. At S10, the ECU checks if the current transmission ratio between the input shaft 1 and the output shaft 2 driven by the input shaft 1 via the continuously variable transmission, which drops during the course of a speed increase, or a transmission ratio between the input shaft 1 and the output shaft 2 when this output shaft is driven by the bypass transmission has reached, for example, the aforementioned value of 0.4 and if a driving speed of the motor vehicle is at least 70 km/h (43 mph).

If this is the case (S10: "Y"), the ECU engages the bypass clutch C at S20 and thereby automatically couples the input shaft 1 to the output shaft 2 by or via the bypass gearing. Otherwise, the ECU repeats at S10.

At S30, the ECU then automatically reduces an actuating force of the continuously variable transmission by lowering a hydraulic actuating pressure for axially tensioning the double cone 13. When the bypass gearing should be decoupled again, for example, because the driving speed is lower than 70 km/h (43 mph) or higher than 160 km/h (100 mph) (S40: "Y"), the ECU increases the actuating force of the continuously variable transmission at S50 by increasing the hydraulic actuating pressure and then decouples the bypass gearing at S60 by disengaging the bypass clutch C after the required actuating force of the continuously variable transmission for coupling the input and output shafts 1, 2 by the continuously variable transmission without the bypass transmission has been built up or reached. The ECU then returns to S10. As long as the bypass gearing should not be decoupled again (S40: "N"), the ECU maintains the reduced hydraulic actuating pressure, which is specified such that the traction and/or thrust means 14 remains tensioned.

FIG. 2 shows another embodiment of a motor vehicle drivetrain in the form of an illustration corresponding to FIG. 1. Corresponding characteristics are identified by identical reference symbols such that we refer to the preceding description and only differences between the embodiments are discussed below. In the exemplary embodiment illustrated in FIG. 2, the driving gearwheel 21 of the bypass gearing is separably coupled to the driving shaft 10 of the continuously variable transmission, as well as the input shaft 1, via the bypass clutch C and the driven gearwheel 23 of the bypass gearing, which meshes with the driving gearwheel 21, is rigidly coupled to the driven shaft 11 of the continuously variable transmission and the driving shaft of the epicyclic gearing.

FIG. 3 shows another embodiment of an inventive motor vehicle drivetrain in the form of an illustration corresponding to FIGS. 1, 2. Corresponding characteristics are identified by identical reference symbols such that we refer to the preceding description and only differences between the embodiments are discussed below. In the exemplary embodiment illustrated in FIG. 3, the driving gearwheel 21 of the bypass gearing is separably coupled to the driving shaft 10 of the continuously variable transmission, as well as the input shaft 1, via the bypass clutch C and the driven gearwheel 23 of the bypass gearing, which meshes with the driving gearwheel 21, is rigidly coupled to a driven shaft 103 of the epicyclic gearing, as well as to the output shaft 2. In the embodiment according to FIG. 3, the double cone 13 is furthermore connected to the driven shaft 11 in a rotationally rigid fashion.

In the embodiments illustrated in FIGS. 1 and 2, the input and output shafts 1, 2 can be coupled via the bypass gearing 21-23 with two fixed transmission ratios, which differ with respect to their value, by alternatively engaging the clutch C1 or C2 while the clutch C3 is disengaged and the clutch C is engaged. In this case, the bypass gearing 21-23 is designed in such a way that it realizes the transmission ratio of 0.4 between the input shaft 1 and the output shaft 2 when the clutch C2 is engaged and the clutch C1 is disengaged. The continuously variable transmission 10-14 likewise realizes the minimum forward motion of 0.3 of the variable transmission ratio between the input shaft 1 and the output shaft 2 when the clutch C2 is engaged and the clutch C1 is disengaged.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle drivetrain comprising:
   an input shaft;
   an output shaft;
   a continuously variable transmission having a variable transmission ratio selectively coupling the input shaft to the output shaft, wherein the variable transmission ratio has a maximum forward motion and a minimum forward motion; and
   a bypass transmission with at least one bypass gearing having a fixed transmission ratio selectively coupling the input shaft to the output shaft, wherein a value of a transmission ratio of the bypass gearing is less than or equal to half the sum of the value of the maximum forward motion and the value of the minimum forward motion but not greater than 1.0.

2. The motor vehicle drivetrain according to claim 1, wherein the bypass transmission is configured to drive the motor vehicle with a driving speed of at least 31 mph.

3. The motor vehicle drivetrain according to claim 1, further comprising a shift transmission configured to selectively couple the continuously variable transmission to one of the output shaft or the input shaft, wherein the shift transmission includes a first forward gear with a first fixed forward transmission ratio, and at least one of a second forward gear with a second fixed forward transmission ratio and a reverse gear with a fixed reverse transmission ratio.

4. The motor vehicle drivetrain according to claim 3, wherein the bypass transmission is operably coupled to the shift transmission.

5. The motor vehicle drivetrain according to claim 3, wherein the bypass transmission is kinematically arranged parallel to the shift transmission.

6. The motor vehicle drivetrain according to claim 3, wherein the bypass transmission is kinematically arranged in series with the shift transmission.

7. The motor vehicle drivetrain according to claim 1, wherein the bypass transmission is operably coupled to one of the input shaft, the output shaft, a driving shaft or a driven shaft of the continuously variable transmission.

8. The motor vehicle drivetrain according to claim 1, wherein the bypass transmission is kinematically arranged parallel to the continuously variable transmission.

9. The motor vehicle drivetrain according to claim 1, wherein at least one of the bypass transmission and the continuously variable transmission comprises a free-wheel mechanism.

10. The motor vehicle drivetrain according to claim 1, wherein at least one of the bypass transmission and the continuously variable transmission comprises a selectively engageable clutch.

11. The motor vehicle drivetrain according to claim 10, wherein the selectively engageable clutch is selected from the group consisting of a frictionally engageable clutch, positively acting clutch or a synchronizing clutch.

12. The motor vehicle drivetrain according to claim 10, wherein the selectively engageable clutch is selected from the group consisting of an electrically engageable clutch, a mechanically engageable clutch, a hydraulically engageable clutch or a pneumatically engageable clutch.

13. The motor vehicle drivetrain according to claim 1 further comprising an electronic control unit configured to selective couple and decouple the input shaft to the output shaft with the bypass transmission based on at least one of a current transmission ratio of the continuously variable transmission and a driving speed of the motor vehicle.

14. The motor vehicle drivetrain according to claim 13, wherein the electronic control unit is further configured to automatically reduce an actuating force of the continuously variable transmission after the input shaft has been automatically coupled to the output shaft by the bypass transmission.

15. The motor vehicle drivetrain according to claim 14, wherein the electronic control unit is further configured to automatically increase the actuating force of the continuously variable transmission and subsequently decouple the bypass transmission.

16. The motor vehicle drivetrain according to claim 1, wherein the bypass gearing comprising a cylindrical gearing.

17. A motor vehicle comprising a motor operably coupled to the motor vehicle drivetrain according to claim 1.

* * * * *